United States Patent
Frascella et al.

(10) Patent No.: US 10,501,282 B2
(45) Date of Patent: Dec. 10, 2019

(54) DEVICE FOR BRAKING LINES OF TYING TWINE

(71) Applicant: KVERNELAND GROUP RAVENNA S.R.L., Russi (IT)

(72) Inventors: Cosimo Frascella, San Giorgio Jonico (IT); Valerio Casadei, Bertinoro (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 0 days.

(21) Appl. No.: 15/562,530

(22) PCT Filed: Mar. 25, 2016

(86) PCT No.: PCT/EP2016/056706
§ 371 (c)(1),
(2) Date: Sep. 28, 2017

(87) PCT Pub. No.: WO2016/156267
PCT Pub. Date: Oct. 6, 2016

(65) Prior Publication Data
US 2018/0105388 A1    Apr. 19, 2018

(30) Foreign Application Priority Data

Mar. 31, 2015 (EP) .................................... 15425027

(51) Int. Cl.
*A01F 15/14* (2006.01)
*B65H 59/06* (2006.01)

(52) U.S. Cl.
CPC ............. *B65H 59/06* (2013.01); *A01F 15/14* (2013.01); *A01F 15/141* (2013.01); *A01F 15/145* (2013.01)

(58) Field of Classification Search
CPC .................. A01F 15/141; A01F 15/145; A01F 2015/143; B65H 59/06; B65B 13/02; B65B 13/18
(Continued)

(56) References Cited

U.S. PATENT DOCUMENTS 2,781,719 A * 2/1957 Hedtke .................... A01F 15/12
100/19 A
4,282,803 A * 8/1981 Cools .................... A01F 15/141
100/5
(Continued)

FOREIGN PATENT DOCUMENTS

EP    2119343 B1    11/2009
EP    1308080 A3    5/2013

OTHER PUBLICATIONS

International Search Report issued in connection with PCT Application No. PCT/EP2016/056706 dated Jun. 1, 2016.

*Primary Examiner* — Jimmy T Nguyen
(74) *Attorney, Agent, or Firm* — Steven M. Shape; Dennemeyer & Associates, LLC

(57) ABSTRACT

A device for braking lines of tying twine, for agricultural machines, of the type of balers, round balers and the like. Such machines are provided with assemblies for typing bales of previously-cut agricultural products, or the type of grass, wheat, maize, hay, forage, and the like. The braking device includes an electronic unit for controlling and managing at least one actuator for moving at least one braking element, which is actuated by the electronic unit by way of the actuator, in order to retain at least partially at least one respective length of at least one line of twine, during its unreeling.

10 Claims, 4 Drawing Sheets

(58) Field of Classification Search
USPC .............................. 100/5, 13, 15, 19 R, 19 A
See application file for complete search history.

(56) References Cited

U.S. PATENT DOCUMENTS

| | | | | |
|---|---|---|---|---|
| 4,612,855 A | * | 9/1986 | Wagstaff ............... | A01F 15/141 100/5 |
| 5,215,005 A | * | 6/1993 | Schlotterbeck ....... | A01F 15/141 100/13 |
| 6,883,422 B2 | * | 4/2005 | Viaud ................... | A01F 15/141 100/19 A |

* cited by examiner

DEVICE FOR BRAKING LINES OF TYING TWINE

BACKGROUND OF THE INVENTION

The present invention relates to a device for braking lines of tying twine, for agricultural machines of the type of balers, round balers and the like.

As is known, there is a widespread need to gather agricultural products of the type of grass, wheat, maize, hay, forage and the like, into bales of various shapes and sizes.

In fact, during the formation of the bales the agricultural products are compressed, thus reducing the overall space occupation: this evidently allows practical transport and easy storage, and more generally it makes them more easily available for subsequent processing, as a function of the specific purpose for which they are intended.

In order to obtain such result, agricultural machines are thus widely used which are known as "hay balers" or "forage balers", within which a certainly major role is played by "round balers", which produce cylindrical bales.

Round balers, like other similar agricultural machines, are capable of collecting the agricultural products from the ground and transferring them to a compression chamber, which is in turn provided with elements (rollers, belts or catenaries) arranged along the perimeter of the internal compartment of the chamber, in order to entrain and compress the products, in so doing resulting in the formation of the bale.

To ensure the holding of the configuration assumed by the agricultural products, and thus prevent the bale that has just been formed from breaking up, round balers are conveniently provided with contrivances that are capable of wrapping the bale with a polymeric film (or a net) or of tying it with a line of twine.

In more detail, in order to obtain the tying, round balers can be fitted with an apparatus that allows the controlled unreeling of a length of twine from a spool or from a skein (or the like), with which the bale is externally tied.

The apparatus is likewise capable of exerting a braking force on the line of twine, during its unreeling, so as to place the latter under tension, which is necessary in order to firmly hold the agricultural products in the desired format.

In conventional round balers, during each work cycle the tying apparatus is capable of exerting a braking force of variable intensity (as is often required by the applicative requirements), thanks to a plurality of elements that cooperate with each other in an exclusively mechanical manner.

Such implementation solution is not however devoid of drawbacks.

At the design stage, the mutual connection of the above mentioned mechanical elements is conveniently selected as a function of the law of variation of the braking force that it is desired to exert on the line of twine.

It thus appears evident that such law is determined uniquely by the design choices (and thus by the dimensioning and mutual placement of the elements involved). This does not allow any subsequent variation, if requirements dictate it, thus appreciably (and nowadays very unpopularly) reducing the versatility of the apparatus, which will be incapable of being adapted to a possible change of the working conditions of the baler.

Moreover, it must be noted that the same machine may be intended for different customers and different markets, and thus designed for the formation of bales of agricultural products of various different types, with weights, sizes and other chemical/physical properties which are often very different from each other (and their heterogeneity is further increased with the varying of the surrounding meteorological and climate conditions).

In such context, it seems clear that the impossibility of adapting the braking force to the various different types of agricultural product, as a function of the different resistance that each type offers, is a further serious limitation on the conventional solutions.

Lastly, it should be noted that, over time, the wear and natural deterioration of the mechanical elements can sometimes negatively influence correct operation, resulting in a progressive reduction of the braking effectiveness (and bale-tying effectiveness), with no possibility of remedying the situation except by way of complex, and costly, maintenance and repair activities.

The aim of the present invention is to solve the above mentioned problems, by providing a device that is capable of developing an adequate braking force during the tying of the bale.

SUMMARY OF THE INVENTION

Within this aim, an object of the invention is to provide a device that is versatile, capable of adapting the force exerted to the specific operating conditions and in any case of obtaining an optimal tying of the bale.

Another object of the invention is to provide a device that ensures a high reliability of operation and does not require complex maintenance or repair activities.

Another object of the invention is to provide a device that makes it possible to vary the law of variation of braking of the line of twine in a practical and easy manner.

Another object of the invention is to provide a device that enables an optimal tying of the bale just forming, independently of the specific type of agricultural product in the bale and/or of the specific climate conditions.

Another object of the invention is to provide a device that can be easily implemented using elements and materials that are readily available on the market.

Another object of the invention is to provide a device that is low cost and safely applied.

This aim and these objects are achieved by a device for braking lines of tying twine, for agricultural machines, of the type of balers, round balers and the like, which are provided with assemblies for tying bales of previously-cut agricultural products, of the type of grass, wheat, maize, hay, forage, and the like, characterized in that it comprises an electronic unit for controlling and managing at least one actuator for moving at least one braking element, which is actuated by said electronic unit by way of said actuator, for the at least partial retaining of at least one respective length of at least one line of twine, during its unreeling.

BRIEF DESCRIPTION OF THE DRAWINGS

Further characteristics and advantages of the invention will become better apparent from the description of a preferred, but not exclusive, embodiment of the device according to the invention, which is illustrated by way of non-limiting example in the accompanying drawings wherein.

DETAILED DESCRIPTION OF THE INVENTION

Figure 1:
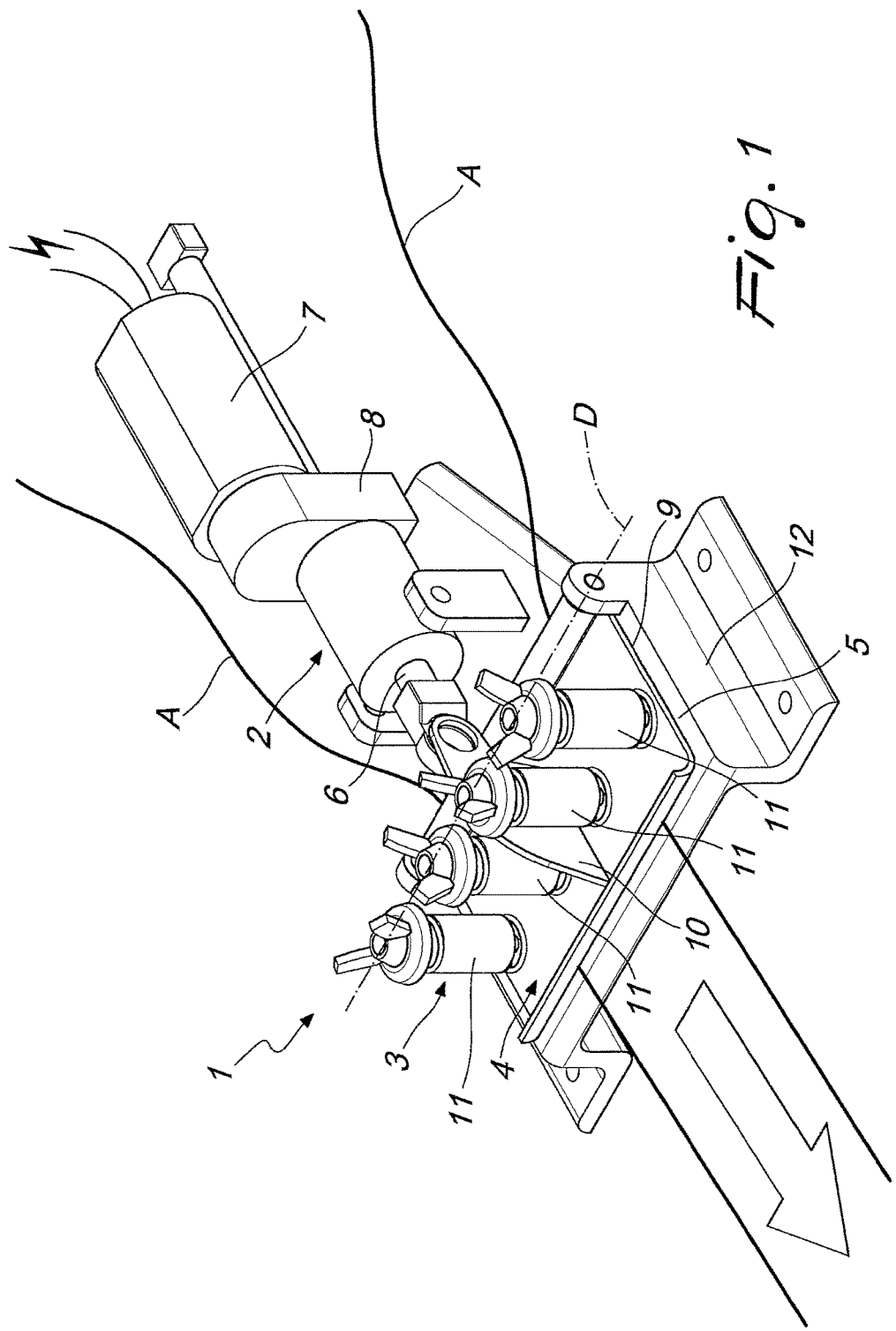
FIG. 1 is a perspective view of the braking device according to the invention.

With reference to the figures, the reference numeral 1 generally designates a device for braking lines of tying twine A, for agricultural machines of the type of balers, round balers and the like.

According to substantially conventional methods in fact, agricultural machines of the type indicated above can proceed over terrain, along which it encounters agricultural products of the type of grass, wheat, maize, hay, forage, usually previously cut and distributed so as to form one or more ordered rows, and picks them up by way of an adapted apparatus for collection and conveyance.

In such agricultural machines, the apparatus then transfers the products to a compression chamber B, in which elements such as rollers, belts or catenaries, arranged along the internal perimeter of the chamber B, entrain and compress those products, resulting in the formation of a bale.

The machines for which the device 1 is preferably used are likewise provided with assemblies for tying bales of the above mentioned products.

According to conventional methods, such assemblies comprise first of all means of unreeling at least one line of twine A, which will be used for tying the bale.

It should be noted in this regard that according to specific requirements the device 1 can be adopted for tying assemblies designed for tying the bale with any desired number of lines of twine A (selected from the most suitable material), which are unreeled, usually at least partially simultaneously, from respective skeins or spools conveniently supported by the agricultural machine.

In the following discussion, reference will occasionally be made to the embodiment shown in the accompanying figures, in which the device 1 acts simultaneously on two lines of twine A, but it should be noted that the concepts explained (and the protection) are understood to be extended to include devices 1 adapted to the braking of any number of lines of twine A. In fact, it will be immediately evident that the considerations that follow can obviously be valid for any number of lines of twine A to be braked.

It should likewise be noted that the method with which the means achieve the unreeling of the lines of twine A and the consequent tying of the bale are preferably conventional and can thus have the supports around which to coil the skeins or the spools of twine A, such as pulleys, brackets that define respective eyelets, and other, similar solutions, in order to guide the unreeling of the line of twine A along a preset path, until it reaches the chamber B and thus until the tying of the bale is obtained.

Such elements, like the entire tying assembly, will thus be preferably arranged proximate to the compression chamber B of the agricultural machine, or in any case to the region of space in which the bale is formed and contained, so as to be able to transfer a length of each line of twine A to the bale. Moreover, it is the bale proper, with its rotation within the compression chamber B, that entrains an end length of each line of twine A and thus causes the unreeling from the skein and the tying.

The context outlined above and the agricultural machines described in brief above thus define the preferred application of the present invention: in fact, the device 1 will preferably be arranged along a side wall C of the compression chamber B, along the path of the lines of twine A (as defined by the means of unreeling), obviously before these lines come into contact with the bale.

In such context, the device 1 makes it possible (thanks to the innovative methods that will be explained below) to exert a braking force on the lines of twine A, so as to place them under tension, as is necessary in order to firmly hold the agricultural products in the desired format.

It should be noted in any case from this point onward that the possibility is not ruled out of using the device 1 in different environments as well, and with other types of agricultural machines and/or agricultural products, according to specific requirements, while remaining within the scope of protection claimed herein.

According to the invention, the braking device 1 comprises an electronic unit for controlling and managing at least one actuator 2 for moving at least one braking element 3.

The element 3, which is actuated by the electronic unit by way of the actuator 2, is thus capable of at least partially holding at least one respective length of the at least one line of twine A, during its unreeling, thus obtaining the desired braking thereof.

The use of an electronic unit likewise makes it possible to achieve from this point onward the set aim, in that it makes it possible to command at will the braking of the lines of twine A, with no limitation dictated by the design choices (dimensioning, mutual position etc.) regarding the various elements involved (as happens in conventional devices, which exclusively act mechanically).

More specifically, the electronic unit is programmable according to at least one law of variation of intensity of the braking force, during each tying cycle (of the bales).

Even more specifically, the electronic unit can be programmed according to a plurality of such laws of variation of intensity of the braking force. Each law can thus be freely adopted, in order to execute a respective tying cycle, according to the requirements (which are dictated for example by the specific operating conditions, by the type and size of the agricultural products, by the climate etc.).

In fact, the possibility is not excluded of providing the electronic unit with two or more laws of variation (or of making it possible to program a different law of variation at another time). Thus this makes it possible to vary the method of braking (and the corresponding tension determined on each line of twine A) between one tying cycle and the next (as well as within the same cycle, obviously), according to specific requirements, without having to make further modifications to the device 1.

Thus, an interface can be provided which is associated with the electronic unit, in order to allow the convenient choice or variation of the operating parameters of the device 1 according to the invention, and especially for programming the electronic unit proper, for example by way of storing and recalling various sets of parameters (which define different laws of variation), which are freely adoptable and variable as a function of the circumstances.

It should be noted that the electronic unit can be freely selected, while remaining within the scope of protection claimed herein: it can in fact be an electronic controller, a (micro)processor, a CPU, a PC, a computer etc.

In the preferred embodiment, illustrated in the accompanying Figures for the purposes of non-limiting example of application of the invention, the braking element 3 includes a skid 4 which is functionally associated with the actuator 2. The skid 4 can oscillate about a working axis D (shown in FIG. 1), so that, following such oscillation (commanded by the electronic unit by way of the actuator 2), the skid 4 can be pressed, in at least one active configuration (FIG. 3), against a reference surface 5.

In this manner, the desired at least partial braking is obtained of the respective length of twine A, which to this end will conveniently be guided and clamped between the surface 5 and the skid 4, during its unreeling (thanks to the choice of placement of the device 1, including in relation to the location of the means of unreeling).

Conveniently, the skid 4 can be pressed against the surface 5 with a force of variable intensity, according to the law of variation that has been set, so as to obtain along the tying cycle an optimal progression of the intensity of the braking force, according to the specific requirements.

In an embodiment of significant practical interest, the actuator 2 is of the linear type, and thus comprises, as a functional element, a rod 6 that can perform a translational motion along a straight path E (see FIGS. 2 and 3), in order to command the oscillation of the skid 4.

In particular, in such embodiment, the rod 6 of the linear actuator 2 is moved along the straight path E by way of a mechanism of the screw/translation screw type. Such mechanism can in turn be actuated, directly or indirectly, by a motor 7 (for example, but not exclusively, of the electric type) controlled by the electronic unit.

Even more specifically, and with further reference to the embodiment visible in the accompanying figures, the braking device 4 comprises a gearmotor 8, interposed between the motor 7 and the actuator 2.

In a different embodiment, the linear actuator 2 is of the electromagnetic type. It can thus be of the type of a linear induction motor, or of an electromagnet associated with a moving element in ferromagnetic material.

It should be noted in any case that the possibility is not ruled out of using hydraulic or pneumatic actuators 2, or other implementation solutions (for the actuator 2, which can be selected to be not of the linear type), while remaining within the scope of protection claimed herein.

In the embodiment shown for the purposes of example in the accompanying figures, the skid 4 comprises a plate 9, which is designed, together with the surface 5, to clamp the respective length of the two lines of twine A, for their braking. The plate 9 is rigidly supported by a rib 10 which is articulated to the rod 6 of the actuator 2.

In this manner, control is obtained of the oscillation of the skid 4, about the working axis D, as a consequence of the translation along the straight path E of the rod 6 (to which the rib 10 of the skid 4 is articulated).

Conveniently, the braking device 1 according to the invention comprises at least one spring 11, usually acting on the skid 4, in order to keep it at least partially pressed against the surface 5, which is in turn defined for example by a fixed counter-skid 12 (made of metal or of non-aggressive material).

The force developed by the actuator 2 is thus conveniently selected to enable the latter to defeat the elastic reaction of the spring 11, when it is desired to move the skid 4 away from the surface 5, in order to allow the free unreeling of the lines of twine A.

It should be made clear that according to the specific requirements (of the elastic reaction that it is intended to develop), the number of springs 11 can be selected freely (and for example can be four in number, as in the example in the accompanying figures), while remaining within the scope of protection claimed herein.

Operation of the device according to the invention is therefore evident from the foregoing discussion (and from the accompanying figures).

As has been seen in fact, thanks to the means of unreeling (which are selected from conventional types), one or more lines of twine A can move along a preset path (which for example has portions within the compression chamber B, but also optionally portions outside the agricultural machine).

Thus, the lines of twine A can reach and wrap a bale that has just been formed, determining its desired tying.

The device 1 can thus be arranged along the aforementioned path, and exerts a braking action on the lines of twine A, of freely variable intensity (based on the programming entered on the electronic unit), in order to be able to effectively hold the agricultural products that make up the bale on which the tying is carried out. Thus, an optimal tying is obtained, in that the device 1 places the lines of twine A under tension while the latter slide along the cross-section of the bale in order to wrap it (and indeed tie it).

Figure 2:
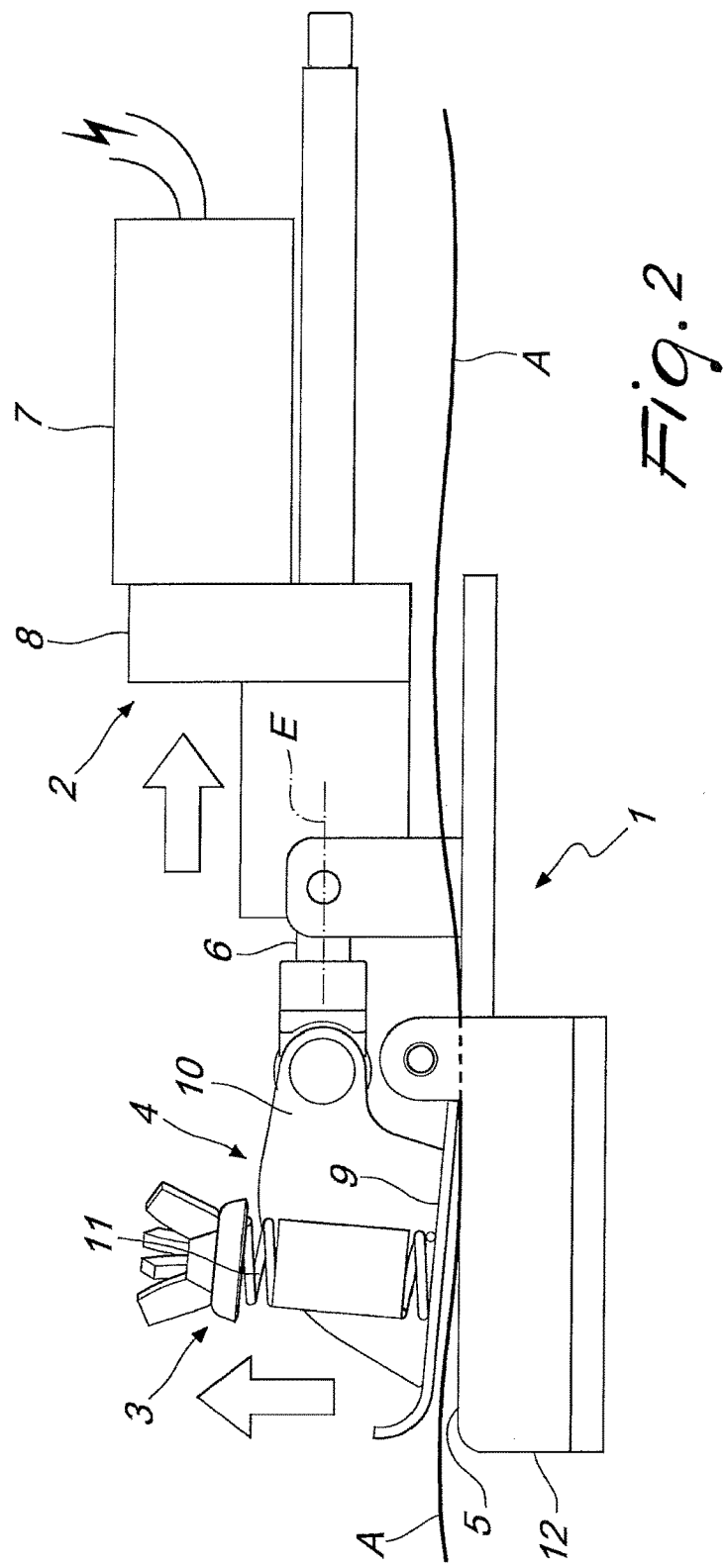
FIGS. 2 and 3 are side elevation views of the operation of the braking device in FIG. 1.
Figure 3:
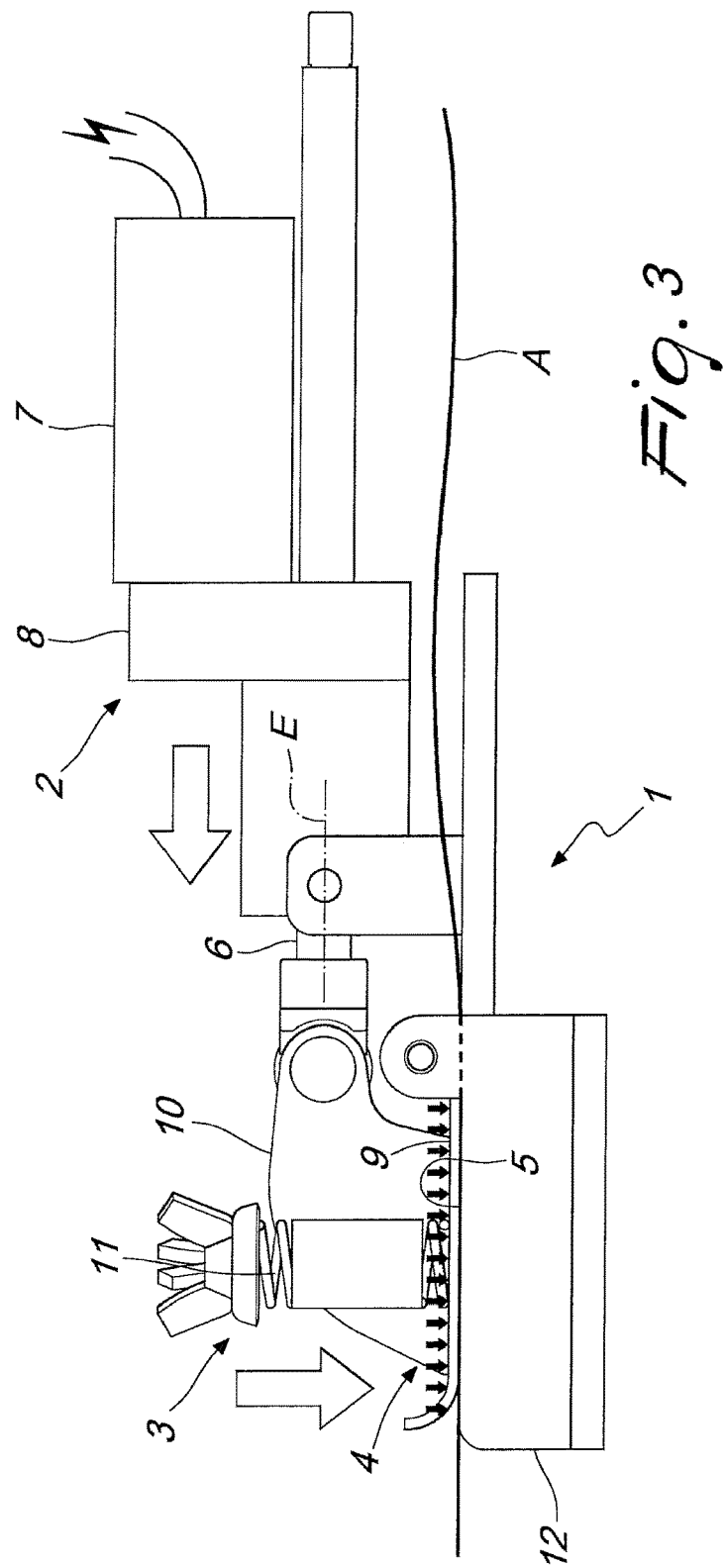
Figure 4:
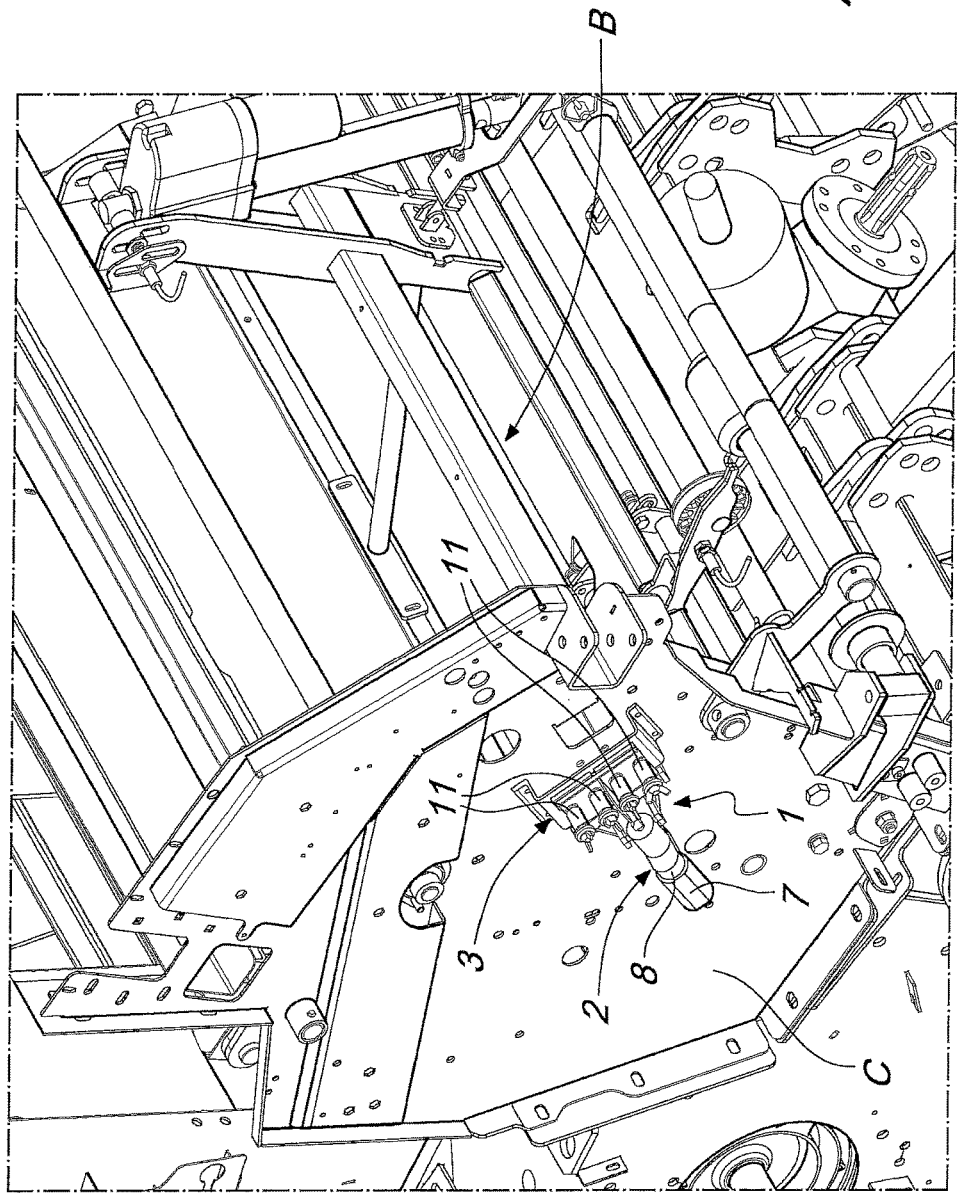
FIG. 4 shows the device in FIG. 1, in conditions of use.

In more detail, as can be seen from FIGS. 2 and 3, the braking is obtained thanks to the oscillation of the skid 4 about the working axis D. While in the arrangement in FIG. 2 the skid 4 is distanced from the counter-skid 12 and from the abutment surface 5, thus not interfering in any way with the unreeling of the lines of twine A, by making the skid 4 oscillate it is in fact possible to rotate it to the active configuration in FIG. 3, in which it presses against the abutment surface 5 and clamps (braking them) the lines of twine A, which are guided between the skid 4 and the counter-skid 12.

In order to obtain such oscillation, and more generally the command and control of the braking, as has been seen the device 1 is advantageously provided with an electronic unit designed to actuate an actuator 2.

Moreover, in the arrangement in FIG. 3, a further push of the actuator 2 can conveniently increase the intensity of the braking force, if required by the specific application requirements and by the preset law of variation.

It is thus evident that the electronic unit confers high versatility and practicality of use on the device 1 according to the invention. In fact, it makes it possible to exert a force of intensity adapted to the specific operating conditions and in any case to obtain an optimal tying of the bale, simply by setting and varying (by way of a convenient interface) the desired law of variation of intensity of the braking force.

Precisely the ability to vary the methods of braking simply by acting on the electronic unit eliminates the need for complex alterations, in order to adapt the device 1 to changed operating conditions.

Thus, independently of the specific type of agricultural product that makes up the bale and/or of the specific climate conditions, the device 1 in any case ensures an optimal tying of the bale.

Furthermore, even if phenomena of wear or deterioration should develop over time, a simple intervention on the electronic unit and/or on the actuator 2 can restore the optimal operating conditions, without requiring complex maintenance or repair activities.

In practice it has been found that the device according to the invention fully achieves the set aim, in that the use of an electronic unit for controlling and managing at least one actuator for moving at least one braking element makes it possible to retain effectively, and in a versatile manner, a length of at least one line of tying twine, during its unreeling, thus providing a device that is capable of developing an adequate braking force during the tying of the bale.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in EPA n. 15425027.8 from which this application claims priority are incorporated herein by reference.

Where the technical features mentioned in any claim are followed by reference numerals and/or signs, those reference numerals and/or signs have been included for the sole purpose of increasing the intelligibility of the claims and accordingly, such reference numerals and/or signs do not have any limiting effect on the interpretation of each element identified by way of example by such reference numerals and/or signs.

The invention claimed is:

1. A device for braking lines of tying twine for round balers, for agricultural machines, which are provided with assemblies for tying bales of previously-cut agricultural products, comprising an electronic unit for controlling and managing an actuator (2) for moving a braking element (3), which is actuated by said electronic unit by way of said actuator (2), for retaining a length of at least one line of twine (A), during unreeling of the twine (A), wherein said braking element (3) comprises a skid (4) functionally associated with said actuator (2) and oscillates about a working axis (D), said skid (4) being pressed against a reference surface (5) for the braking of a respective length of the at least one line of twine (A), which is guided and clamped between said surface (5) and said skid (4) during its unreeling.

2. The device according to claim 1, wherein said electronic unit is programmable according to a variable braking force, during each tying cycle.

3. The device according to claim 2, wherein said electronic unit is programmable to vary an intensity of the braking force to carry out a respective tying cycle.

4. The device according to claim 1, wherein said skid (4) is pressed against said surface (5) with a force of variable intensity.

5. A device for braking lines of tying twine for round balers, for agricultural machines, which are provided with assemblies for tying bales of previously-cut agricultural products, comprising an electronic unit for controlling and managing an actuator (2) for moving a braking element (3), which is actuated by said electronic unit by way of said actuator (2), for retaining a length of at least one line of twine (A), during unreeling of the twine (A), and an oscillating skid (4), wherein said actuator (2) is of a linear type, and comprises a rod (6) that can translate along a straight path (E), in order to command the oscillation of said oscillating skid (4).

6. The device according to claim 5, wherein said rod (6) of said actuator (2) is moved along said straight path (E) by way of a mechanism, actuated directly or indirectly, by a motor (7) controlled by said electronic unit.

7. The device according to claim 6, comprising a gear-motor (8), interposed between said motor (7) and said actuator (2).

8. The device according to claim 5, wherein said actuator (2) is electromagnetic.

9. A device for braking lines of tying twine for round balers, for agricultural machines, which are provided with assemblies for tying bales of previously-cut agricultural products, comprising an electronic unit for controlling and managing an actuator (2) for moving a braking element (3), which is actuated by said electronic unit by way of said actuator (2), for retaining a length of at least one line of twine (A), during unreeling of the twine (A), and a skid (4) including a plate (9), which is designed, together with a surface (5), to clamp the twine (A), for its braking, said plate (9) being rigidly supported by a rib (10) articulated to a rod (6) of said actuator (2), in order to command oscillation of said skid (4) around a working axis (D) as a consequence of translation of said rod (6) along a straight path (E).

10. The device according to claim 1, further comprising a spring (11), wherein said spring (11) acts on said skid (4) to keep said skid (4) pressed against said surface (5).

* * * * *